United States Patent

Morioka et al.

[11] 4,368,232
[45] Jan. 11, 1983

[54] GLASS FIBER MAT AND METHOD OF PREPARATION THEREOF

[75] Inventors: Masayoshi Morioka, Satte; Sadao Kawashima, Sohwa, both of Japan

[73] Assignee: Asahi Fiber Glass Company Limited, Chiyoda, Japan

[21] Appl. No.: 152,352

[22] Filed: May 22, 1980

[30] Foreign Application Priority Data

Jun. 26, 1979 [JP] Japan .................................. 54-79693

[51] Int. Cl.³ ............................................. B32B 17/04
[52] U.S. Cl. .................................... 428/228; 428/285; 428/288; 156/181; 156/162; 65/9
[58] Field of Search ...................... 428/285, 288, 228; 65/9; 156/181, 162

[56] References Cited

U.S. PATENT DOCUMENTS 3,134,145 5/1964 Miller ......................................... 65/9
3,492,103 1/1970 Schuller et al. .......................... 65/11

Primary Examiner—Marion McCamish
Assistant Examiner—B. Johnson
Attorney, Agent, or Firm—Oblon, Fisher, Spivak, McClelland & Maier

[57] ABSTRACT

A glass fiber mat is prepared by piling a strand formed by collecting a number of glass fibers on a conveyor in a non-oriented state by making the strand into contact with a rotating cylinder to throw it; thus forming a mat like layer and piling another strand cutting or without cutting on said mat like layer to be a thin layer and said another strand being drawn from a cake.

8 Claims, 6 Drawing Figures

GLASS FIBER MAT AND METHOD OF PREPARATION THEREOF

BACKGROUND OF THE INVENTION

1. Field of the Invention

The present invention relates to a glass fiber mat. More particularly, it relates to a glass fiber mat useful as a reinforcing material of a fiber reinforced plastic material (FRP) and a method of preparation thereof.

2. Description of the Prior Art

It has been known to prepare a glass fiber mat by collecting a large number of glass fibers drawn from bushings while applying a size to said glass fibers and gathering the glass fibers into a strand by means of collecting device and bringing the strand into contact with the surface of a pulling wheel rotated at high speed to pull the strand at high speed and throw it so as to pile on a moving conveyor in a looped and a non-oriented state while applying a mat binder. Japanese Utility Model Publication Sho No. 43-234, for example, discloses a process for preparing the mat (referred to as the wheel pulling process) in detail.

A mat prepared by the wheel pulling process consists of a large number of continuous strands arranged in a looped and non-oriented state and only the contacting point of each strand is bonded with a binder such as synthetic resin. The mat is referred to as a continuous strand mat (simply referred to as CSM) and is widely used as the reinforcing material of FRP because it has an excellent property as follows.

The strands for CSM are bonded together in a looped and non-oriented state so that the CSM becomes bulky. Accordingly, the bulk density of the CSM can be smaller than that of a mat formed by chopped strands. When the CSM is used as a material of FRP, the breaking of the mat does not occur even in the deep drawing operation by the press molding.

The CSM has an excellent wet-through property of resin so that the processability is excellent because a uniform impregnation of the resin into the CSM can be attained when a liquid resin is applied to the CSM.

However, the CSM (used as a reinforcing material) is impregnated with resin and the resin is cured to provide FRP and if a resin having a large shrinkage rate is used, individual strands forming the CSM appears on the surface of FRP like a line during the curing of the resin; thus a smooth surface is not obtained.

A chopped strand mat (simply referred to as CM) is known as one of the glass fiber mats used as the reinforcing material of FRP.

CM is most commmonly used for FRP and is prepared from a cake as a starting material. The cake is usually prepared by collecting a large number of glass fibers into a strand while a size is applied to the glass fibers and winding the strand, giving a reciprocal traverse movement, on a tube made of paper which is inserted on a mandrel rotated at high speed. The cake is usually dried by heat to cure the size and then is fed to the following working place. A large number of cakes are employed and a strand is drawn from each cake simultaneously and is fed to a cutter to be cut at a predetermined length. The resulting chopped strands are piled on a moving conveyor and a mat binder is applied to the chopped strands. The chopped strands (simply referred to as CS) are heated to cure the mat binder. The length of CS is usually several cm. However, longer CS such as those with a length in the range of 10 to 15 cm are used if necessary.

CS can be formed by cutting a roving which is composed of a plurality of the strands.

CM is economical and is suitable for mass production and is widely used as a reinforcing material of FRP. When CM is used in the hand lay-up process, a good mold-conformability can be attained and the operation is easy. However, when a force is applied at a local portion of CM, that portion elongates to decrease the strength in the elongated portion. When a deep drawing operation is carried out, the deep drawn portion in the CM is easily broken disadvantageously.

The strand used in the CSM is continuously looped so that the CSM used as the reinforcing material of FRP is free from the decreasing of strength in any local portion due to the local elongation of the mat in the molding operation as with the use of CM. Thus, the use of CSM provides FRP having great strength. Further, CSM has a good mold-conformability and a breaking resistance even in the deep drawing operation. However, the CSM has the following disadvantages. The CSM is more expensive than the CM, the demand is small and products having various qualities can not easily be prepared because production equipment using the wheel pulling process has a direct connection with bushings resulting in a difficulty of the job change (change of kind of product).

Furthermore, there is following limitation in the process for preparing the CSM.

As described above, the CSM is prepared by collecting the glass fibers drawn from the bushings into the strand and piling the strand on the moving conveyor directly. The diameter of the glass fiber drawn from the bushing is apt to be smaller when the drawing speed is increased. In order to obtain a desirable diameter in the range of about several $\mu m$ to ten and several $\mu m$, the drawing speed of the glass fiber should be 1000 m/min. to 2000 m/min. (in the wheel pulling process).

The moving speed of the conveyor is determined depending on the amount of the strand to be piled per unit area of the conveyor and it is usually in the range of about 5 to 20 m/min. because of a limitation of the structure of the conveyor.

Accordingly, the drawing speed of the glass fiber is greatly higher than the moving speed of the conveyor so that the strand is piled on the conveyor in the condition that the strand is continuously looped in a small circle and the loops are slightly shifted.

The cross section of strand wound as the cake has a ratio of a long radius to a short radius in the range of 10:1 to 2:1 so as to be a flat circle in cross-sectioned shape because the strand is tightly wound on the tube and successively wound thereon so that the individual strand are deformed. On the other hand, the strand produced by the wheel pulling process is merely in contact with the surface of the wheel and is thrown so that the strand is not deformed and keeps its circular cross sectioned shape which is resulted by the interfacial tension of the liquid size.

As described above, the CSM is composed of the strand having a circular cross section which is looped in a small radius of curvature wherein each loop is overwrapped with a slightly shifting state thereby providing a great repulsive force to a compression. It is, therefore, difficult to increase the content of glass strand per unit volume compared with CM. This tendency is greatly enhanced in the case using the hand lay-up process.

(The content of glass strand per unit volume is an important factor in improving the properties of FRP such as tensil strength, bending strength etc. When the glass content is small, it is difficult to obtain FRP having large strength.)

The inventors of this application have further studied on the basis of the knowledge and the findings described above, in order to overcome the disadvantages of the conventional mat. As a result, the inventors have found that a better result can be obtained when a wound strand (the strand is preferably dried) is drawn to pile thinly and in a non-oriented state on a glass fiber mat prepared by the wheel pulling process, said wound strand being formed by collecting a large number of glass fibers drawn from bushings, while applying a size, into a strand and by winding the strand on the rotating mandrel.

SUMMARY OF THE INVENTION

It is an object of the present invention to provide a glass fiber mat for reinforcing FRP which has a smooth surface without any appearance of the strand and to provide a method of preparation thereof.

It is another object of the invention to provide a glass fiber mat for reinforcing FRP which has the same excellent properties as the CSM and has a glass fiber content per unit volume greater than that of the CSM and to provide a method of preparation thereof.

It is a further object of the invention to provide a glass fiber mat having a large tensile strength and a large bending strength.

These and other objects of the present invention have been attained by providing a method of preparing a glass fiber mat which comprises;

(a) a step of applying a size to a large number of glass fibers drawn from bushings and collecting the glass fibers into a strand, (b) a step of bringing the strand into contact with the surface of a rotating cylinder to throw and pile it on a moving conveyor in a non-oriented state, (c) a step of drying by heat another strand wound as a cake, (d) a step of drawing the dried strand to pile it in a non-oriented state on the layer obtained in the step (b) as a thin layer.

In the step (d) wherein the strand wound as the cake and dried is drawn, a step in which the strand is cut at a length greater than 1 m may be added.

The present invention is to provide a FRP reinforcing mat formed by piling a strand drawn from a cake, with or without cutting, on a mat-like layer which is prepared by pulling another strand by bringing it into contact with a cylindrical surface rotating at a high speed; thus throwing the strand so as to be piled in a non-oriented state, said strand being formed by applying a size to a number of glass fibers drawn from bushings and collecting them.

DETAILED DESCRIPTION OF THE PREFERRED EMBODIMENTS

Figure 1:
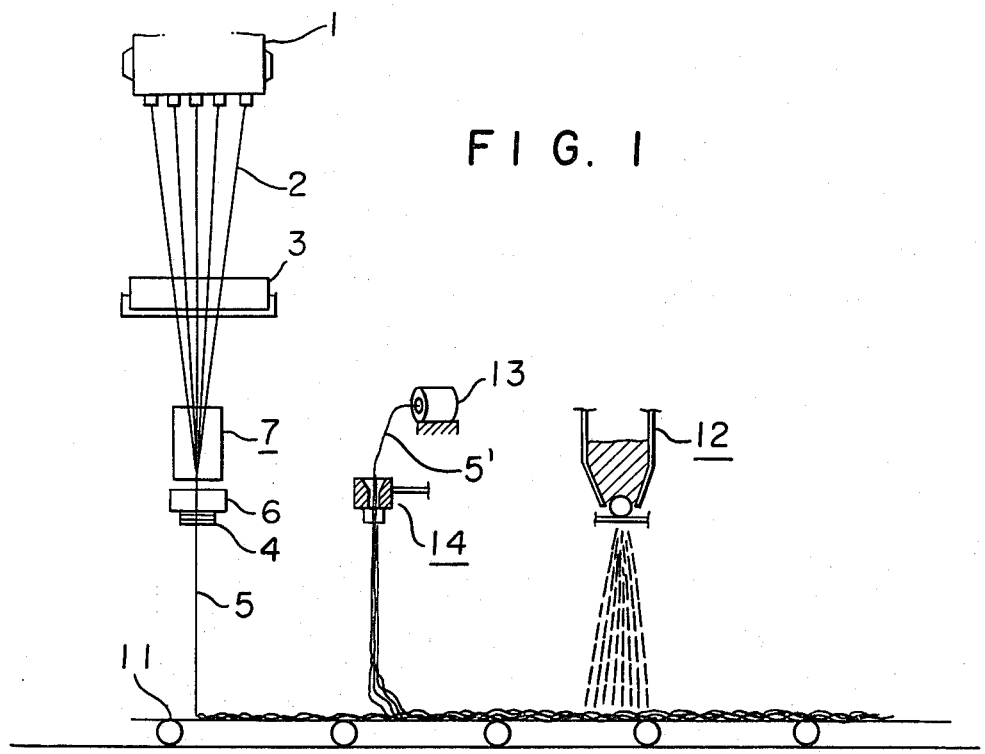
FIG. 1 is a front view of an embodiment of an apparatus used for preparing a glass fiber mat of the present invention.
Figure 2:
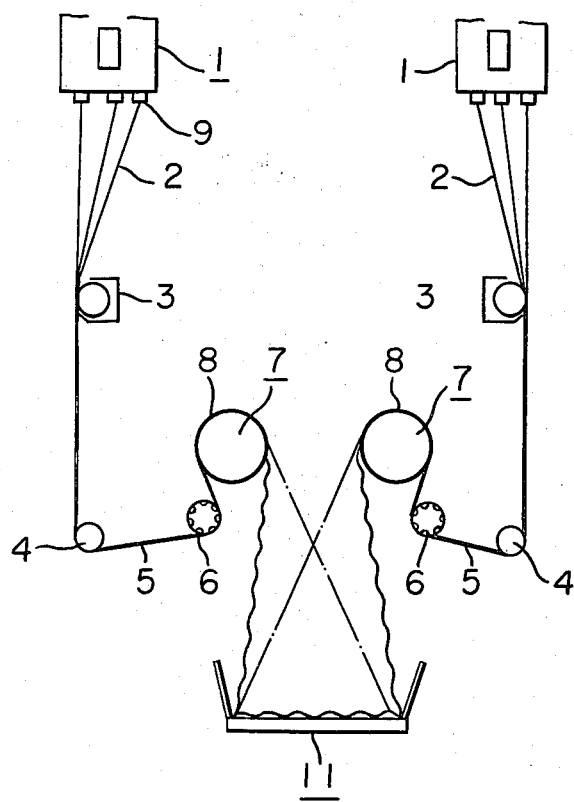
FIG. 2 is a side view of an apparatus used in the wheel pulling process.

An embodiment of the present invention will be described with reference to drawings.

A plurality of glass fibers (2) pulled out from bushings (1) are coated with a size by an applicator (3) and then collected by a collecting device (4) into a strand (5). The strand (5) is brought into contact with the surface (8) of a pulling wheel (7) rotated at a high speed through rollers (4) and (6) so that the strand is pulled due to the frictional force on the cylindrical surface (8) during the revolution of the wheel to attenuate the streams (9) of molten glass coming from the bushings; thus resulting in a fine glass fiber (2). It is preferable to use a liquid size of a high molecular resin emulsion such as polyester, epoxy or polyvinylalcohol. The number of the collected glass fibers is usually 30 to 300 or so. A sufficiently large amount of the liquid size is applied to the strand so that the gaps between individual glass fibers which form the strand are filled and each strand possesses a circular cross section due to the interfacial tension of the size.

Figure 3:
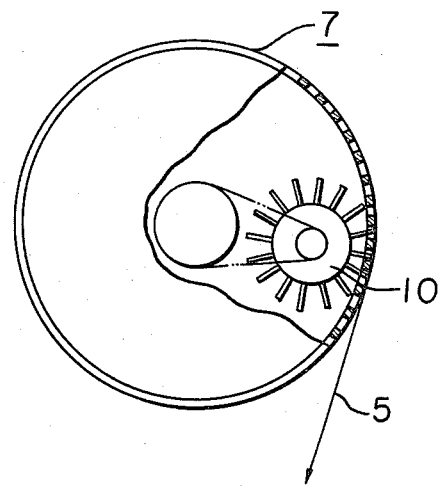
FIG. 3 is a partially broken and enlarged side view of a rotating cylinder.

The strand is brought into contact with the cylindrical surface (8) to be pulled which throws the strand in the tangential direction at the position of a strand-separation gear (10) (FIG. 3) so that the strand is piled on a movable and perforated conveyor in a looped and non-oriented state. It is possible to distribute the strand uniformly on the entire width of the conveyor by providing a periodical change in the position of the separation gear so as to shift the separating position of the strand.

The lower surface of the perforated conveyor is kept at a reduced pressure in order to suck the air on the conveyor so as to attract the strand on the conveyor and to remove the excessive size.

The reference numeral (12) designates a sprayer for a mat binder which provides strong bonding to the strands. When heat is applied to dry it as described later, the strands are mutually bonded at their contacting portion to provide an integrally bonded mat. The mat binder can be emulsion or powder of a polyester or epoxy system.

A desired amount of the distributed strand is in the range of about 300 to 1000 gr/m².

The reference numeral (13) designates a "cake" which is formed by collecting a number of glass fibers pulled out from the bushings under the application of the size; winding the strand on a tube of paper which is inserted on a rotating mandrel while applying a traversing movement; removing the tube on which the strand is wound and drying the strand by heating. The detailed description of this process is omitted because the process is well known in the field of the textile production.

In the production of the cake, a number of collected glass fibers is usually in the range of 50 to 200. The size can be vinyl acetate emulsion or acrylic emulsion besides the above-described size capable of use in the wheel pulling method. The former size can not be used in the wheel pulling method even when it is desirable to use them because of the nature of the product because the size tends to adhere to and pile on the rotating cylinder used in the wheel pulling method.

Figure 4:
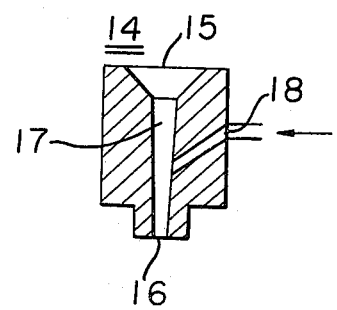
FIG. 4 is an enlarged sectional view of an air nozzle used for drawing a dried strand.

A pulling device (14) for pulling the strand (5') from the cake comprises a feeding passage (17) having a diameter decreasing from the strand-inlet end (15) (FIG. 4) to the outlet end (16) and a highly pressurized air injection hole (18) communicating to the passage. The highly pressurized air injection hole (18) crosses obliquely to the feeding passage (17) to inject the pressurized air into the end of the feeding passage. The following advantage can be obtained by using such an air injecting type feeding device (air nozzle) even though another technique can be used to pull the strand.

(1) When the strand is pulled from the cake, an entanglement of the strand sometimes occurs and forms a mass of the strand which may enter into a product. When the entanglement of the strand occurs and if the strand is pulled by strong pulling force, the strand may be broken. On the other hand, when the strand is pulled using the air nozzle no strong pulling force is applied thereby preventing the breaking of the strand and keeping the entrance of the entangled strand into the product free because the entangled strand is prevented from moving in the feeding passage.

(2) When the strand is pulled by the air nozzle, the highly pressurized air is applied to the surface of the strand to filamentize it into individual glass fibers. When a mat formed by the filamentized strand by using the process of the present invention is used for the reinforcing material for FRP, FRP having a more smooth surface can be obtained in comparison with that formed by the strand without filamentization.

The number of cakes is not critical and is determined depending upon the moving speed of the perforated conveyor, the amount of the flat strand to be distributed on the mat formed by the wheel pulling process and the width of the mat.

When the air nozzle is used, the orientation of the strands falling on the conveyor continually varies to form an uniform layer of the strand curved in a non-oriented from. If it is desired, the air nozzle can be swung. It is preferable to distribute the flat strand in the range of 50 to 300 gr/m$^2$ so as to keep the amount of the strand less than $\frac{1}{3}$ of the strand distributed by the wheel pulling process. When the amount is too large, the wet-through property decreases disadvantageously.

The strand piled like a mat thus obtained is heated to cure the mat binder and the size. The heating time and the temperature are determined depending on the kind of size etc. and these are usually in the range of about 120° to 180° C. and about 1 to 3 minutes.

According to the method of this embodiment, the glass fiber drawn from the cake can be kept at the optimum diameter and the pulling speed can be greatly reduced because the glass fiber is pulled out after having been wound on the tube.

As it is clearly understood from the description hereinafter, when the mat of the present invention is used in the reinforcing material for FRP, FRP having a smooth surface can be obtained and the strand does not appear on the surface of FRP. The mat is not broken even in the deep-drawing operation by a press-molding machine. The method of the present invention is preferable to the production of the glass fiber mat for FRP.

The glass fiber mat as a reinforcing material for FRP, having the structure described above, has the following excellent properties. The appearance of the strand on the surface of FRP is prevented to provide a smooth surface. The reason is that a layer having a relatively low wet-through property of resin formed by the flat glass strand drawn from the cake is provided on the mat having an excellent wet-through property formed by the strands by the pulling wheel process by which the strands were formed so as to have a circular cross section. Accordingly, the upper layer has high resin content and the strand of the upper layer is flat so that the appearance of the strand is prevented.

The resilient repulsive force of the upper layer of the mat of the invention is smaller than that of the lower layer so that the compression rate of the upper layer of the mat is greater than that of the lower layer. Consequently, when the mat for reinforcing FRP is clamped in a pair of molds, a surface layer having a large apparent density, namely a large glass fiber content can be formed. Accordingly, when FRP is made using the reinforcing mat of the present invention, the content of the glass fiber in the layer in contact with the mold is naturally larger than that of the inside part of the layer not in contact with the mold so that FRP having a large surface strength and bending strength can be obtained.

Another embodiment of the method of the present invention will be described.

The cake formed in the same manner as the first embodiment is heated at about 130° C. for about 5 hours to dry it so as to cure the size sufficiently and the glass strand is drawn from the cake and cut at a length greater than 1 m and the cut strands are piled applying the mat binder on the previously formed layer which is the same as that of the first embodiment and are heated to attain a bonded state. Thus, the glass fiber mat of the present invention can be continuously produced.

According to this embodiment, the glass strand of the upper layer is kept at the optimum diameter and the drawing speed can be greatly reduced because the glass strand is drawn from the cake after having been wound into the cake. Furthermore, the strand is supplied on the conveyor not continuously but after the cutting of it so that the cut strands piled on the conveyor do not have a small curvature of radius and loops whose position are slightly shifted, like the strands in the CSM obtained by the wheel pulling process but have a large curvature of radius as described later and is piled in a random state. The piled strands can be compressed to give high bulk density in comparison with the conventional CSM because the glass strand of the invention is flat-shaped by being drawn after having been wound into the cake. The effect is remarkable when the hand lay-up process is used.

The chopped strands of the conventional CM are substantially linear and are arranged in a non-oriented state. FRP formed by the conventional CM as a reinforcing material suffers the elongation of a part of the mat during the molding operation to cause the decreasing of the strength of a local area so that the strength of the CM is lower than that of FRP reinforced with the CSM and the deep drawing operation can not be attained in a case using the CM.

The inventors have attempted to provide a CS having a cut length greater than that of the conventional type commonly known and have found the following fact. When the length of the CS is small, the CS is linear whereas when large, the CS tends to be arranged in a curved form. The relation of the length and the curvature of CS depends upon the diameter etc. of the CS. Generally, when the length of CS is larger than 60 cm, a substantial curve of CS is found and the mat formed by CS having this length has an improved deep drawing characteristic. When the length of CS is larger than 1 m, the mat formed by randomly distributing the looped strand having a large radius of curvature can be obtained. It is found that the mat thus formed has the same uniform strength distribution and excellent deep drawing characteristic as the conventional CSM.

The mat produced by the process of this embodiment can be elongated in any portion during the molding operation and is free from the decrease of strength in a local portion. It has the same uniformity of strength and capability of deep drawing as the conventional CSM. The upper layer can have a large bulk density and a high glass content in the case using the hand lay-up process.

In accordance with the process of the embodiment, the upper layer of the mat is produced by using the cake as a starting material which has been produced in a large amount and is used for various kinds of products having various properties so that various kinds of products which have various kinds of upper layer can be produced without any special equipment because the conventional equipment for producing the CM can be utilized.

Figure 5:
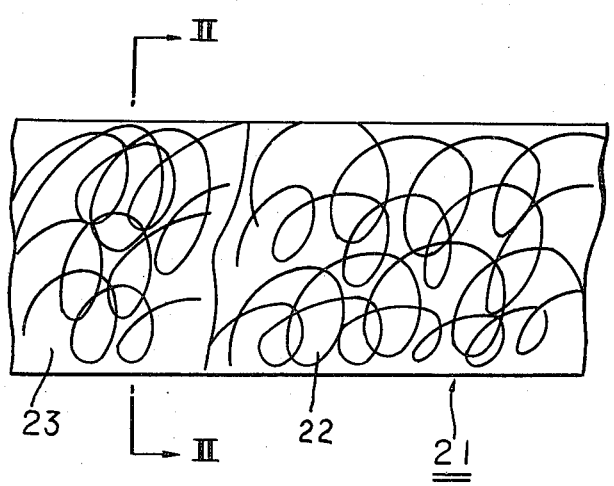
FIG. 5 is a partially broken front view of FRP reinforcing mat of the present invention.
Figure 6:
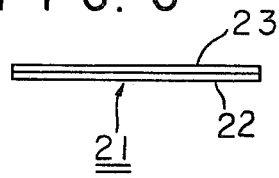
FIG. 6 is a sectional view taken along the II—II line.

FIGS. 5 and 6 show an embodiment of a mat (21) according to the present invention which has a double-layers structure formed by laminating two mat-like strand layers (22), (23) and which is used as a reinforcement of FRP.

The mat-like strand layer (22) (referred to as a strand layer) is formed by collecting a number of glass fibers pulled from the bushings while applying the size into a strand; making the strand contact with the surface of the cylinder rotated at high speed so as to pull and throw it so that the strand is piled on the moving conveyor in a non-oriented state.

The strand is continuously looped to form the strand layer (22) and is circular in cross section.

The strand layer (23) is formed without cutting or cutting the strand pulled from the cake to give a length larger than 1 m, preferably a length in the range of 1 to 3 m and piling the strand on the strand layer (22) in a non-oriented state. The drawing or pulling operation of the strand from the cake is carried out by passing the strand between a pair of rotating rollers or is carried out using the air nozzle or a combination of the rollers and the air nozzle. A mat binder is applied to the strand layers and the layers are dried by heating. Finally, the bonded layers are rolled to make the transportation easy.

The followings are examples of the present invention.

REFERENCE (Preparation of a mat)

50 Glass fibers having a diameter of 17 $\mu$m were drawn from the bushings and unsaturated polyester emulsion was applied to the glass fibers as a size. The glass fibers were passed through a channel formed in a collecting device made of graphite to make a strand. 100 Strands thus obtained were brought into contact with a cylindrical surface rotated at high speed so as to pile at a rate of 450 gr/m$^2$ on a movable perforated conveyor. The strand was of 120 $\mu$m radius and is circular in shape.

EXAMPLE 1

(Preparation of a mat)

A mat was prepared in accordance with the process of Reference except a piling rate of 400 gr/m$^2$. On this mat, strands drawn from the cake as described below were piled at a rate of 50 gr/m$^2$ while applying unsaturated polyester resin mat binder.

80 Glass fibers having a diameter of 10 $\mu$m were pulled from the bushings and vinyl acetate emulsion as a size was applied to the glass fibers, which were collected into a strand in the same manner as Reference. The strand was wound on a mandrel rotated at high speed to form a cake. The cross section of the strand has a diameter of 200 $\mu$m of the long radius and 40 $\mu$m of the short radius so as to be in a flat circular section. The cake was dried by heat at 130° C. for 5 hours. 30 Cakes were used and the strands were pulled from each cake using the air nozzle.

Preparation of FRP

Mats prepared by the processes of Reference and Example 1 were used as reinforcing materials of FRP. Unsaturated polyester resin (Trade name DIC 8010) was applied on the top of each mat at a rate of 1035 gr/m$^2$ so as to impregnate it and the resin is cured.

In FRP with the mat prepared in accordance with the process of Example 1, the surface was smooth and the content of glass fibers in the surface area was 40% whereas in FRP with the mat prepared in accordance with the process of Reference, many strands appear on the surface and the content of glass fibers was 25%.

EXAMPLE 2

A mat was prepared in accordance with the process of Reference except a feeding rate of 400 gr/m$^2$. On this mat, strands drawn from the cake as described below were piled at a rate of 50 gr/m$^2$ while applying unsaturated polyester resin mat binder.

100 Glass fibers having a diameter of 13 $\mu$m were drawn from the bushings while applying vinyl acetate as a size to collect into a strand. The strand was wound on a tube made of paper rotated at high speed to form a cake which was heated at 130° C. for 5 hours. Strands drawn from 30 cakes were pulled out at a rate of 400 m/min. to cut them at a length of 1.5 m and the cut strands were piled at a rate of 50 gr/m$^2$ on a conveyor moving at a speed of 10 m/mm. A mat comprising the cut strands having a curvature of radius of 20 cm and randomly distributed was obtained. Unsaturated polyester resin was impregnated into the mat and the hand lay-up process was used and FRP whose surface appearance is smooth and content of glass strand at the surface area is 40% can be obtained. The strength of FRP was uniform at any location and there was no orientation of strength. The deep drawing characteristic of the mat was equivalent to that produced by the wheel pulling process.

We claim:

1. A process for preparing a glass fiber mat for fiber reinforced plastic material which comprises:
    (a) applying a size to a large number of glass fibers drawn from bushings and collecting the glass fibers into a strand;
    (b) bringing the strand from (a) into contact with the surface of a rotating cylinder to throw and pile it as a layer on a moving conveyor in a non-oriented state;
    (c) drying by heat another strand which is wound as a cake; and
    (d) drawing the dried strand from (c) to pile it in a non-oriented state as a thin layer on the layer obtained in (b).

2. A process for preparing a glass fiber mat according to claim 1 which comprises cutting the strand drawn from the cake at a length permitting the strand to keep a sufficient curvature, applying a mat binder to the cut strands and heating the cut strands in a layer form to bond them together.

3. A process for preparing a glass fiber mat according to claim 1 which comprises periodically shifting the position where the strand is thrown from the rotating cylinder by moving a separation gear to adjust the falling position of the strand.

4. A process for preparing a glass fiber mat according to claim 1 which comprises pulling the strand from the cake with an air nozzle.

5. A process for preparing a glass fiber mat according to claim 1 which comprises swinging the air nozzle to adjust the falling position of the strand.

6. A process for preparing a glass fiber mat according to claim 2 which comprises cutting the strand at a length of at least 1 m.

7. A process for preparing a glass fiber mat according to claim 1 which comprises in (d) piling the dried strand in a thin layer as a flat strand in a distributed amount in the range of about 50 to 300 gr/m$^2$ on the layer obtained in (b) as a mat of a circular strand in a distributed amount in the range of about 300 to 1000 gr/m$^2$, the ratio of said distributed amounts being maintained at less than $\frac{1}{3}$.

8. A glass fiber mat produced by the process of claim 1.

* * * * *